(No Model.)
H. WOOD.
HALTER.
No. 331,670. Patented Dec. 1, 1885.
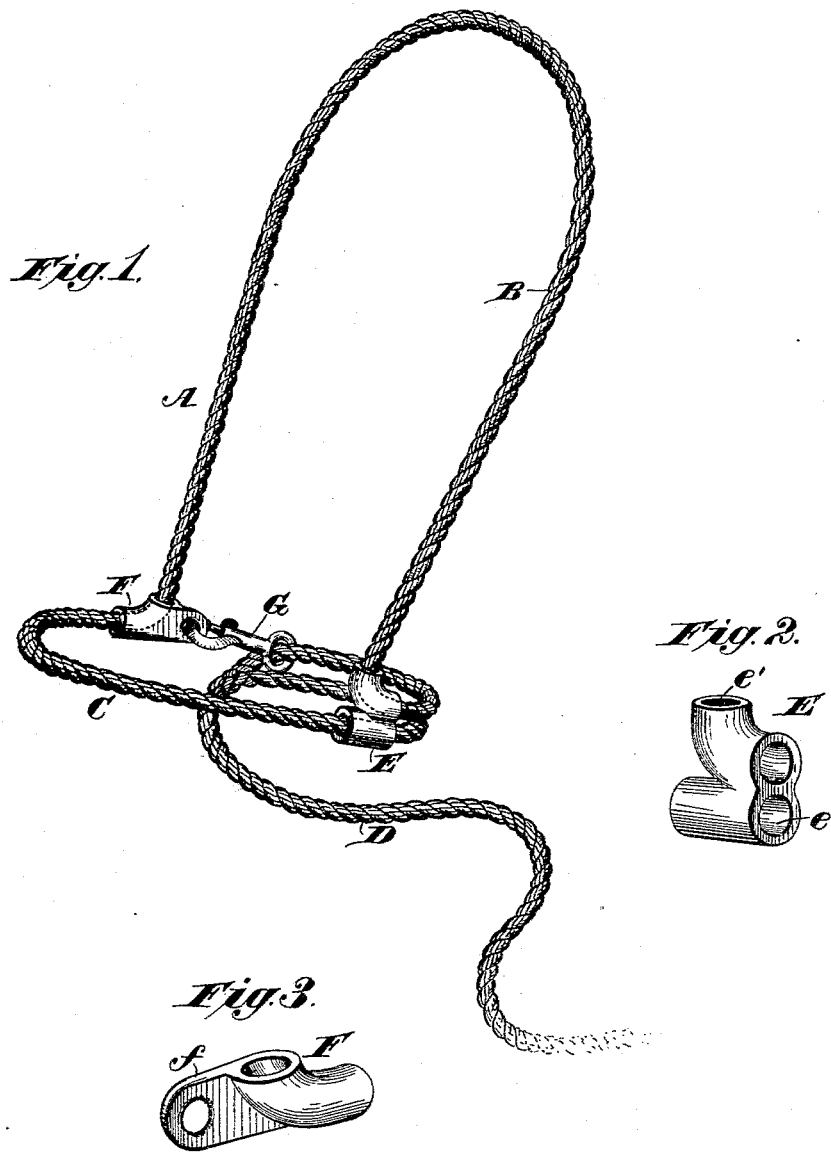
Witnesses
Robert Everett
J. W. Reynolds
Inventor
Hylas Wood.
By Vinton Coombs
Atty.

UNITED STATES PATENT OFFICE.

HYLAS WOOD, OF MARYSVILLE, OHIO.

HALTER.

SPECIFICATION forming part of Letters Patent No. 331,670, dated December 1, 1885.

Application filed April 14, 1885. Serial No. 162,195. (No model.)

*To all whom it may concern:*

Be it known that I, HYLAS WOOD, a citizen of the United States, residing at Marysville, in the county of Union and State of Ohio, have invented certain new and useful Improvements in Halters, of which the following is a specification, reference being had therein to the accompanying drawings.

This invention relates to certain new and useful improvements in halters, and has for its object to provide a halter that may be readily applied and removed from the animal, that will be simple in construction, and capable of being manufactured at small cost.

To these ends my invention consists in the novel arrangement and construction of parts hereinafter fully described, and then specifically pointed out in the claim, due reference being had to the accompanying drawings, forming a part of this specification, wherein—

Figure 1 is a perspective view of a halter made in accordance with my invention, and Figs. 2 and 3 detail views of a portion of the same.

Referring to the drawings, the letter A indicates the halter, made entirely from a single piece of rope or other suitable material.

The halter consists of a head piece or loop, B, a nose-loop, C, and a stale or leading-line, D.

The halter is constructed as follows: One end of a piece of rope or other suitable material is passed through one eye, $e$, of a double thimble, E, and then through the eye of a thimble, F, forming the nose-loop C. It is then carried upward, then downward, and passed through the remaining eye, $e'$, of the double thimble E, forming the head-loop B. The end is next passed through the ring or loop of a snap-hook, G, of any suitable construction, and then spliced or otherwise suitably secured to the part D of the rope forming the stale or leading-line. The double thimble E is constructed of iron or other suitable metal, and consists of two tubes or cylinders cast in one piece, the lower one, $e$, being straight, and the upper one, $e'$, being curved, as shown, in order to give the proper direction to the rope—that is to say, will deflect the rope from a straight line down the side of the horse's head to a line substantially at right angles thereto, in order that that portion of the rope carrying the snap-hook may be passed under the horse's jaw and secured, as will hereinafter appear. The thimble F is also constructed of metal, and is curved similarly to the tube $e'$. The thimble F has cast integral therewith an eye, $f$, and this eye is preferably situated upon the convex side of the thimble. It performs the same function as the tube $e'$ of thimble E— viz., to give the proper direction to the rope passing through it. The thimbles are sufficiently large relatively to the rope to allow the same to pass freely through them.

The halter is applied to the animal as follows: The snap-hook G being first disengaged from the eye $f$, the head-loop B is thrown over the horse's head behind the ears, the nose-loop C passing around the upper part of the nose or upper jaw, and the thimbles E F lying upon each side of the jaw. The portion of the halter carrying the snap-hook G is then passed under and around the animal's lower jaw, and the snap-hook engaged with the eye $f$, the stale leading from the halter in the usual manner. By loosening the loop B at the head the loop C will be tightened around the jaw, and by loosening the loop C the loop B will be tightened at the head. By sliding the thimbles upon the rope passing through them the halter may be easily and quickly adjusted to the head of the animal.

It will be evident that the halter may be made of other material than rope, and by adjusting the thimbles it may be applied to either horses or cattle.

Having described my invention, what I claim, and desire to secure by Letters Patent, is—

A halter constructed of a single piece of rope, and consisting of the head-loop B, nose-loop C, and stale D, in combination with the double thimble E, consisting of the straight tube $e$ and curved tube $e'$, said tubes engaging, respectively, the head-loop B and nose-loop C upon one side of the animal's head, the thimble F, engaging the nose-loop C upon the opposite side of the animal's head, and provided with an eye, $f$, and the hook G, carried by the stale, all the parts being constructed and arranged substantially as shown and described.

In testimony whereof I affix my signature in presence of two witnesses.

HYLAS WOOD.

Witnesses:
LEONIDAS PIPER,
JOHN H. WOOD.